March 17, 1942.  L. FALLER  2,276,950
DEVICE FOR DUSTLESS TRANSFERRING OF POWDERY SUBSTANCES
Filed May 3, 1939
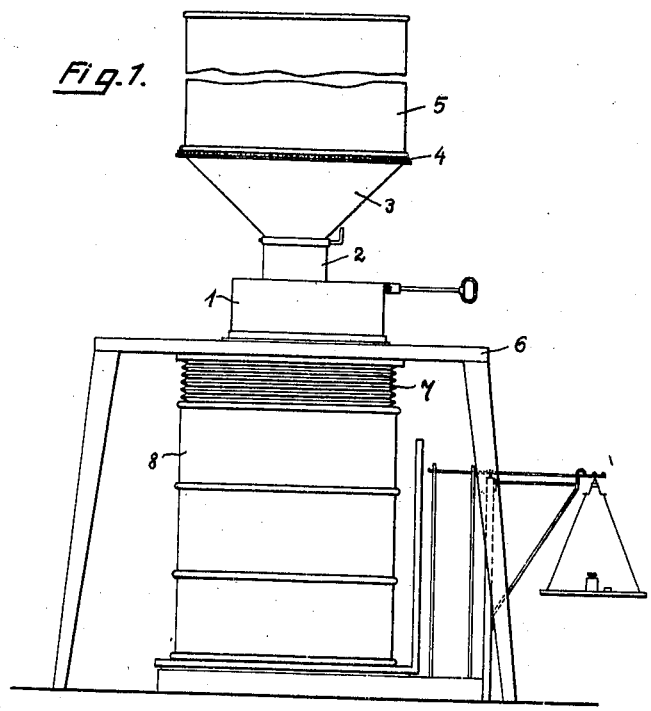
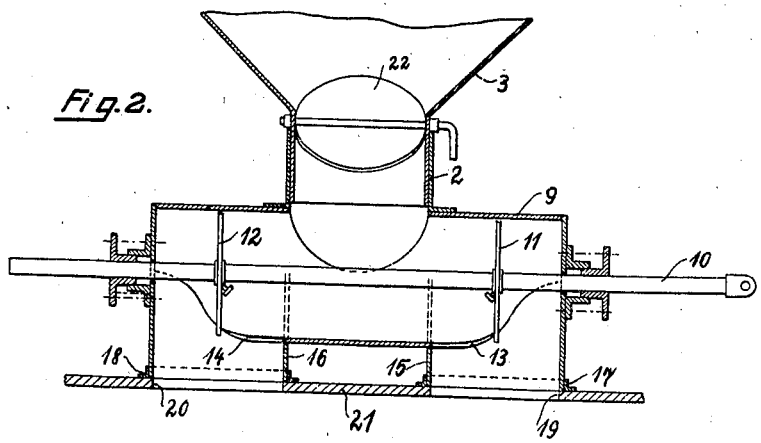
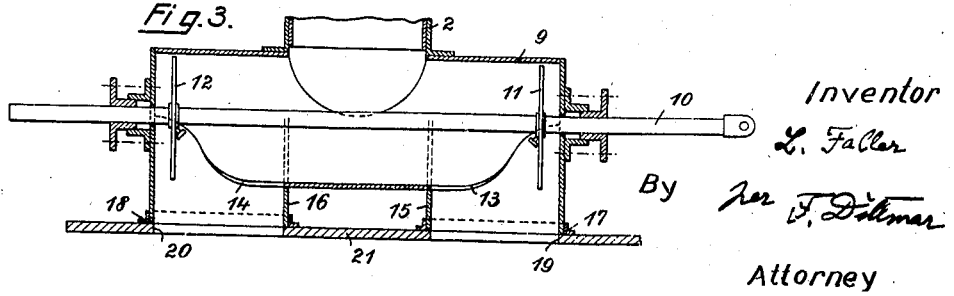
Inventor
L. Faller
By
Attorney Patented Mar. 17, 1942

2,276,950

UNITED STATES PATENT OFFICE 2,276,950

DEVICE FOR DUSTLESS TRANSFERRING OF POWDERY SUBSTANCES

Leopold Faller, Cologne-on-the-Rhine, Germany

Application May 3, 1939, Serial No. 271,597
In Germany August 3, 1938

2 Claims. (Cl. 221—142)

This application was filed in Germany on August 3, 1938, and in France on January 31, 1939.

In factories engaged in manufacture of powdery substances such as bronze-powder, aluminium-powder, powdery colouring matter or similar as well as in those which use such materials, as for example varnish factories, the transfer of the powdery substances in containers for shipment, mixing or stirring machines or the like, is necessary. This is in many places carried out by hand because suitable means for the transfer are lacking. The work causes a great deal of dust to develop. This dust development is not only a nuisance, but often very injurious to the health because the matter being transferred contains in many cases poison. This development of dust requires at least that special accommodation should be reserved for the process of transfer, so that the other parts of the factory are not likewise inconvenienced. Suitable dustproof transfer devices render the setting apart of special accommodation superfluous.

Apart from the avoidance of any dust development a suitable transfer device must be handy and easily transportable, and allows the easy dosing and rapid treatment of definite quantities of the transferred substance. If it is to be used in factories which treat the substances, as for example in varnish factories or the like, for filling the containers for mixing, then it should also possess means to allow the loosening of any lumps in the powdery substance. In conclusion, attention must be given that the transfer device does not have any parts which rub against one another, which may cause sparks to form, as the transfer substance is often highly inflammable and explosions can be caused by sparks. There are of course large transfer devices known which in the factories manufacturing powdery substances are directly connected with the mills or similar apparatus. These however do not correspond to the aim of the present invention because they are too heavy and extensive to be transportable. There is also a small transfer device known, similar to that shown in Fig. 2, but this operates too slowly on account of the arrangement of the loosening disks.

The invention is described with reference to two embodiments, the first of which is specially suitable for factories which are particularly interested in the loosening of the substance for transfer, while the second is adapted for use where more attention is paid to rapid operation.

The drawing, which is only given as an example, represents:

Fig. 1 a general view of the transfer operation in which the devices are used,

Fig. 2 shows the first embodiment of the transfer device in longitudinal section, Fig. 3 is a modified embodiment of the device according to Fig. 2.

According to Fig. 1, the transfer device is represented by 1 having a pipe 2 above; in this a funnel 3 is introduced having on its upper rim a felt packing 4, upon which the supply container 5 rests. The transfer device 1 rests upon a table 6, the portion of the table top beneath the device being removed, and underneath which an accordion-bellows 7 is attached, which is connected by means of a suitable packing or joint with the container 8, into which the powdery substance is to be transferred. This container 8 stands for example on a scale, by which the quantity of material transferred into container 8 may be ascertained.

This drawing shows the method of using the device by which, for example, containers for shipment can be filled from a supply container with specific quantities for shipment. If the transfer is to take place from a container for shipment to a container for mixing, as for example in varnish factories, then the transfer device 1 can be attached at its base to a plate which should be firmly placed upon the mixing container. A scale is seldom necessary in this case, as varnish factories generally buy containers with specified quantities of colouring powder or the like, which are required for each individual mixing process.

Fig. 2 shows a method of accomplishing a transfer during which an especially good loosening of the lumps or cakes in the substance takes place. The pipe 2 which holds the funnel 3, rests on a horizontally placed cylinder 9, in the axial direction of which a bar or rod 10 is introduced, which carries two disks 11 and 12. The lower side of the cylinder 9 has two openings 13 and 14 which become wider towards their ends, and, under which two outlet pipes 15 and 16 are provided and which carry flanges 17 and 18 for supporting them over corresponding openings 19 and 20 of the base plate 21. The plate 21 is formed by either the top of the table 6 or is so arranged that it may be placed upon mixing containers or the like.

For the process of transfer, the throttle-plate 22 of the funnel 3 is opened. The powdery substance falls into the cylindrical casing 9 and from this casing passes through the openings 13 and 14 and the pipes 15 and 16 into the receiving container 8. In order to supplement the transferred process and for loosening the transfer substance, the rod 10 with its disks 11 and 12 attached is moved longitudinally alternately to the right and left of the holes 13 and 14 respectively which widen towards the ends. Engagement of the disks with end walls of the casing limits reciprocating movement of the shaft 10.

In the drawing the disks 11 and 12 are so arranged that they enclose between them about ⅔ of the entire cylinder space. If, however, it is desired that the transfer be especially quickly effected, then the disks may be placed considerably further apart as shown in Fig. 3, so that their distance from the end walls of the cylinder remain only very slight and reciprocating movement of the shaft is shortened. In most cases it is sufficient if the rod only makes very short movements, even if its movements may merely be regarded as a vibration.

The disks 11 and 12 or 12a are made of a material which will not cause sparks by rubbing or knocking against the cylinder 9. For example, if the cylinder 9 is made of iron, then the disks 11, 12 may be of aluminium or plastic material. In order to avoid strong friction they must not fit tight in the cylinder but must have sufficient clearance.

I claim:

1. A transferring device of the character described comprising a base, a casing mounted upon said base, the base being formed with openings, said casing having its end portions provided with outlets spaced from each other longitudinally thereof and communicating with the openings of the base, an inlet neck rising from said casing between the outlets, a container communicating with said neck, a rod extending longitudinally through the casing over its outlets and slidably passing through ends of the casing for reciprocating movement, and agitators carried by the rod within the casing over the outlets, said agitators being engageable with ends of the casing to limit reciprocating movement of the rod and being adjustable along the rod to set positions for controlling the extent of the reciprocating movement.

2. A transferring device of the character described comprising a base formed with spaced openings, an elongated casing extending horizontally over said base, outlet pipes extending downwardly from end portions of said casing and secured to the base about the openings therein, the upper portion of the casing being provided with an inlet located between the outlet pipes, a rod extending longitudinally in said casing and slidably mounted through ends of the casing with one end of the rod adapting the rod to have reciprocating movement imparted thereto, and agitator discs carried by said rod over the outlet pipes and engageable with ends of the casing to limit reciprocating movement of the rod.

LEOPOLD FALLER.